(12) United States Patent
Zukoshi

(10) Patent No.: US 11,772,699 B2
(45) Date of Patent: Oct. 3, 2023

(54) QUICK ATTACH STEERING WHEEL COVER

(71) Applicant: THE MITA CO., LTD., Tokyo (JP)

(72) Inventor: Masato Zukoshi, Kamakura (JP)

(73) Assignee: THE MITA CO., LTD., Tokyo (JP)

( * ) Notice: Subject to any disclaimer, the term of this patent is extended or adjusted under 35 U.S.C. 154(b) by 0 days.

(21) Appl. No.: 17/800,233

(22) PCT Filed: Jan. 21, 2021

(86) PCT No.: PCT/JP2021/001996
§ 371 (c)(1),
(2) Date: Aug. 17, 2022

(87) PCT Pub. No.: WO2021/166538
PCT Pub. Date: Aug. 26, 2021

(65) Prior Publication Data
US 2023/0109551 A1 Apr. 6, 2023

(30) Foreign Application Priority Data
Feb. 21, 2020 (JP) ................................. 2020-027792

(51) Int. Cl.
*B62D 1/06* (2006.01)

(52) U.S. Cl.
CPC ...................... *B62D 1/06* (2013.01)

(58) Field of Classification Search
CPC ............. B62D 1/06; B62D 1/065; B62D 1/04
See application file for complete search history.

(56) References Cited

U.S. PATENT DOCUMENTS

| 2,309,374 A | * | 1/1943 | Alexander | B62D 1/06 74/558 |
| 2,491,803 A | * | 12/1949 | De Heras | B62D 1/06 74/558 |
| 2,618,987 A | * | 11/1952 | Goldstine | B62D 1/06 428/31 |

(Continued)

FOREIGN PATENT DOCUMENTS

| JP | S63176773 A | 7/1988 |
| JP | H09188261 A | 7/1997 |

(Continued)

OTHER PUBLICATIONS

International Search Report (Japanese and English) and Written Opinion (Japanese) of the ISA issued in PCT/JP2021/001996, dated Mar. 9, 2021; ISA/JP.

(Continued)

*Primary Examiner* — Daniel D Yabut
*Assistant Examiner* — Brian J McGovern
(74) *Attorney, Agent, or Firm* — Harness, Dickey & Pierce, P.L.C.

(57) ABSTRACT

Provided is a vehicle steering wheel cover that is easy to be produced and that does not take much time to be attached to a steering wheel. The vehicle steering wheel cover is a ring-shape tube, and is provided with a slit formed so as to be fitted to the steering wheel along the inner circumference inside the ring-shaped tube. The hardness of material of a part of the tube is lower than the hardness of material of the other parts thereof.

11 Claims, 11 Drawing Sheets

(56) References Cited

U.S. PATENT DOCUMENTS

| | | | | |
|---|---|---|---|---|
| 5,042,318 | A * | 8/1991 | Franz | B62D 1/06 74/558 |
| 5,207,713 | A * | 5/1993 | Park | F16F 15/023 74/558 |
| 5,327,799 | A * | 7/1994 | Lin | B62D 1/06 74/558 |
| 5,743,154 | A * | 4/1998 | Jacinth | B62D 1/06 74/558 |
| 11,084,517 | B1 * | 8/2021 | Strong | B62D 1/06 |
| 2001/0010179 | A1 * | 8/2001 | Ku | B62D 1/06 74/558 |
| 2006/0033628 | A1 * | 2/2006 | Duval | A61B 5/082 701/1 |
| 2009/0095121 | A1 * | 4/2009 | Huang | B62D 1/06 74/558 |
| 2011/0219910 | A1 * | 9/2011 | Wu | B62D 1/06 74/558 |
| 2014/0053679 | A1 * | 2/2014 | He | B62D 1/06 264/328.17 |
| 2015/0217794 | A1 | 8/2015 | Kong et al. | |
| 2015/0239487 | A1 * | 8/2015 | Huang | B62D 1/06 74/558 |
| 2016/0107674 | A1 * | 4/2016 | Fiumefreddo | B62D 1/06 74/558 |
| 2016/0347346 | A1 * | 12/2016 | Simmons | B62D 1/06 |
| 2017/0120845 | A1 * | 5/2017 | Coley | B62D 1/06 |
| 2017/0129528 | A1 * | 5/2017 | Fiumefreddo | B62D 1/06 |
| 2017/0197651 | A1 * | 7/2017 | Huang | B62D 1/06 |
| 2019/0283791 | A1 * | 9/2019 | Strong | B62D 1/06 |
| 2020/0239059 | A1 * | 7/2020 | Mondragón | B62D 1/06 |

FOREIGN PATENT DOCUMENTS

| | | |
|---|---|---|
| JP | 3173002 U | 1/2012 |
| JP | 2019081471 A | 5/2019 |
| KR | 1020100120920 A | 11/2010 |
| KR | 1020170124309 A | 11/2017 |

OTHER PUBLICATIONS

Notice of Reasons for Refusal for Japanese Patent Application No. 2020-027792, dated Nov. 30, 2020.

Decision to Grant a Patent for Japanese Patent Application No. 2020-027792, dated Dec. 15, 2020.

* cited by examiner

VI-VI cross-sectional

Completed F

FIG.12

| Sample | Thickness of ring-shape tube | Hardness (other part) (degrees) | Low hardness (part) (degrees) | Attaching time | Remarks | Judgment |
|---|---|---|---|---|---|---|
| 1 | Approx. 2.5 mm | Approx. 70 | Approx. 50 to 60 | Approx. 15 seconds | Rubber easily slips off steering wheel after attachment | △ |
| 2 | Approx. 3.5 mm | Approx. 70 | Approx. 50 to 60 | Approx. 15 seconds | Remains firm even after attachment. Hard to slip | ◎ |
| 3 | Approx. 2.5 mm | Approx. 75 | Approx. 50 to 60 | Approx. 20 seconds | Takes time to attach | ○ |
| 4 | Approx. 3.5 mm | Approx. 75 | Approx. 50 to 60 | Approx. 25 seconds | Takes time to attach | △ |
| Competitor's product | — | — | — | Approx. 57 seconds | Takes twice or more time to attach | × |

QUICK ATTACH STEERING WHEEL COVER

CROSS-REFERENCE TO RELATED APPLICATIONS

This application is a 371 U.S. National Phase of International Application No. PCT/JP2021/001996 filed on Jan. 21, 2021, which claims the benefit of priority from Japanese Patent Application No. 2020-027792 filed on Feb. 21, 2020. The entire disclosure of all of the above applications is incorporated herein by reference.

TECHNICAL FIELD

The present invention relates to a vehicle steering wheel cover.

BACKGROUND ART

A steering wheel cover may be attached to a steering wheel of a vehicle to protect the steering wheel from dirt, scratches or the like, or a steering wheel cover may be attached to a steering wheel as decoration of the steering wheel or to improve a grip feeling of the steering wheel. In such cases, steering wheel covers that are easy to be attached to the steering wheel are also being developed.

It is an object of Literature 1 to provide a steering wheel cover that enables easy attachment by a customer and ensures long term grip comfort of the steering wheel after its attachment. The steering wheel cover consists of a plurality of cover members joined at their longitudinal ends. A steering wheel cover is disclosed in which tensile stress of the cover members when extension coefficient is 5% ranges from 5 to 25 N/2.54 cm and the longitudinal ends are convex.

It is an object of Literature 2 to provide a highly hygienic vehicle steering wheel cover showing excellent touch and appearance, and good adhesion to the steering wheel such that the steering wheel cover will not slip even when a user grips the steering wheel from the top of the cover, allowing a force of tightening the steering wheel to last for a long time. A vehicle steering wheel cover consisting of a cylindrical film made of synthetic resin is disclosed, an inner diameter of which corresponds to 65 to 95% of the diameter of the automobile steering wheel, 25% extension stress in a circumferential direction of which is 4.0 to 7.0 kg, and 25% residual stress of which is 2.8 kg or above.

CITATION LIST

Patent Literature

PATENT LITERATURE 1: JP-A-2019-81471
PATENT LITERATURE 2: JP-A-1997-188261

SUMMARY OF INVENTION

Technical Problem

However, according to the invention described in Literature 1, the plurality of cover members 2 need to be sewn with a thread 4 at longitudinal ends 3 of the cover members, and it is time-consuming to produce the steering wheel cover. On the other hand, according to the invention described in Literature 2, it is time-consuming to attach the steering wheel cover to the steering wheel.

Solution to Problem

It is an object of the present invention to solve the aforementioned problems described in Literature 1 and Literature 2.

A first invention is a vehicle steering wheel cover that is a ring-shape tube and is provided with a slit formed so as to fit the steering wheel along an inner circumference inside the ring-shape tube. The hardness of material of a part of the tube is lower than the hardness of material of the other parts of the tube. This allows the steering wheel cover to be easily attached to the steering wheel and makes it possible to provide a steering wheel cover that that can secure a feeling of fit to the steering wheel, grip comfort and safety after attaching the steering wheel cover.

According to a second invention, when the steering wheel cover is fitted to the steering wheel, the part of the ring-shape tube is located on the back side part of the steering wheel. This makes it possible to attach the steering wheel cover to the steering wheel much more quickly and provide a steering wheel cover that can further secure a feeling of fit to the steering wheel, grip comfort and safety after attaching the steering wheel cover.

According to a third invention, the part of the ring-shape tube is a lower-half of the steering wheel. This makes it possible to attach the steering wheel cover to the steering wheel much more quickly and provide a steering wheel cover that can further secure a feeling of fit to the steering wheel, grip comfort and safety after attaching the steering wheel cover.

According to a fourth invention, the hardness of material of the part of the ring-shape tube is approximately 55 degrees (±5 degrees) to approximately 60 degrees (±5 degrees). This makes it possible to attach the steering wheel cover to the steering wheel much more quickly and provide a steering wheel cover that can secure a feeling of fit to the steering wheel, grip comfort and safety after attaching the steering wheel cover.

According to a fifth invention, the hardness of material of the other parts of the ring-shape tube is approximately 70 degrees (±5 degrees) to approximately 75 degrees (±5 degrees). This makes it possible to attach the steering wheel cover to the steering wheel much more quickly and provide a steering wheel cover that can secure a feeling of fit to the steering wheel, grip comfort and safety after attaching the steering wheel cover.

According to a sixth invention, the material of the other parts of the ring-shape tube is approximately 70 degrees. This makes it possible to attach the steering wheel cover to the steering wheel much more quickly and provide a steering wheel cover that can secure a feeling of fit to the steering wheel, grip comfort and safety after attaching the steering wheel cover.

According to a seventh invention, the thickness of the ring-shape tube is approximately 2.5 (±0.5 mm) to approximately 3.5 mm (±0.5 mm). This makes it possible to attach the steering wheel cover to the steering wheel much more quickly and provide a steering wheel cover that can secure a feeling of fit to the steering wheel, grip comfort and safety after attaching the steering wheel cover.

According to an eighth invention, the thickness of the ring-shape tube is approximately 3.5 mm (±0.5 mm). This makes it possible to attach the steering wheel cover to the steering wheel much more quickly and provide a steering wheel cover that can secure a feeling of fit to the steering wheel, grip comfort and safety after attaching the steering wheel cover.

According to a ninth invention, the inside of the ring-shape tube is reticulated. This makes it possible to provide a steering wheel cover that further improves a feeling of fit to the steering wheel after attaching the steering wheel cover.

According to a tenth invention, the ring-shape tube is covered with circular fabric and the circular fabric is sewn into the ring-shape tube. This makes it possible to provide a steering wheel cover that can further secure grip comfort and safety of the steering wheel after attaching the steering wheel cover.

According to an eleventh invention, the ring-shape tube is covered with circular fabric and the circular fabric is sewn into the ring-shape tube. This makes it possible to provide a steering wheel cover that can further secure grip comfort and safety of the steering wheel after attaching the steering wheel cover.

A twelfth invention is a method for producing the vehicle steering wheel cover according to any one of the first invention to the eleventh invention, the method including a step of producing a ring-shape tube using a material with varying hardness and a step of providing a slit along an inner circumference of the ring-shape tube. This makes it possible to attach the steering wheel cover to the steering wheel more quickly and provide a steering wheel cover that can secure a feeling of fit to the steering wheel, grip comfort and safety after attaching the steering wheel cover.

A thirteenth invention further includes a step of cutting fabric, a step of sewing the cut fabric into a circular shape and a step of covering the ring-shape tube with the circular fabric and sewing the fabric into the ring-shape tube. This makes it possible to provide a steering wheel cover that can further secure grip comfort and safety of the steering wheel after attaching the steering wheel cover.

A fourteenth invention further includes a step of cutting sponge, a step of sewing the cut sponge into a circular shape and a step of sewing the circular sponge inside the circular fabric before covering the tube ring-shape tube with the circular fabric. This makes it possible to provide a steering wheel cover that can further secure grip comfort and safety of the steering wheel after attaching the steering wheel cover.

Advantageous Effects of Invention

When the steering wheel cover is attached to the steering wheel, since the hardness of material of a part that is tightened is reduced, no additional force is required to attach the tightened steering wheel cover to the steering wheel, and so the steering wheel cover can be easily attached to the steering wheel. The conventional steering wheel cover takes about one minute to attach, whereas the steering wheel cover of the present invention can be attached in ten seconds or so. Since only the hardness of material of the part that is tightened is reduced, it is possible to prevent deterioration of grip comfort of the steering wheel due to relaxation after the attachment, which may be caused by lessening of the overall hardness. A possibility generated by reducing the overall hardness that the cover may be dislocated when turning the steering wheel is eliminated, and it is possible to provide a safety-conscious steering wheel cover. That is, it is possible to provide a steering wheel cover that can secure a feeling of fit to the steering wheel, grip comfort and safety after attaching the steering wheel cover.

Further features and advantages of the present invention can be more clearly understood from the following description regarding suitable and non-limiting embodiments.

BRIEF DESCRIPTION OF DRAWINGS

FIG. 12 is a diagram illustrating test results when the thickness and hardness of the ring-shape tube are changed.

DESCRIPTION OF EMBODIMENTS

Figure 1:
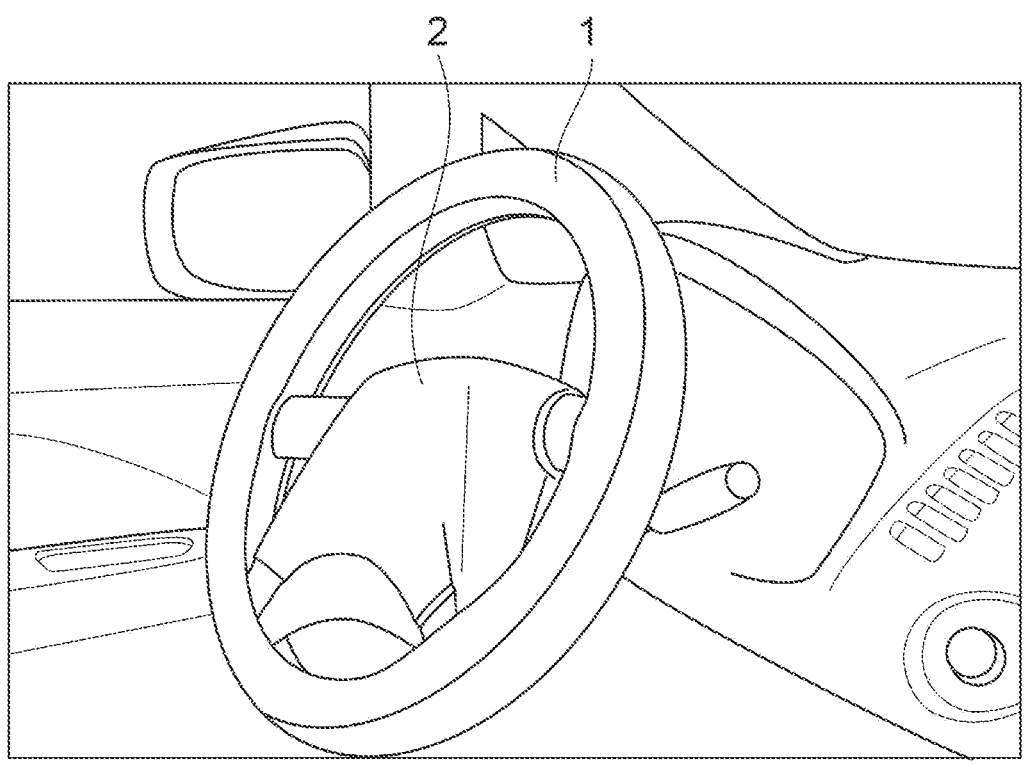
FIG. 1 is a diagram illustrating a vehicle steering wheel cover according to an embodiment of the present invention attached to a steering wheel.
Figure 2:
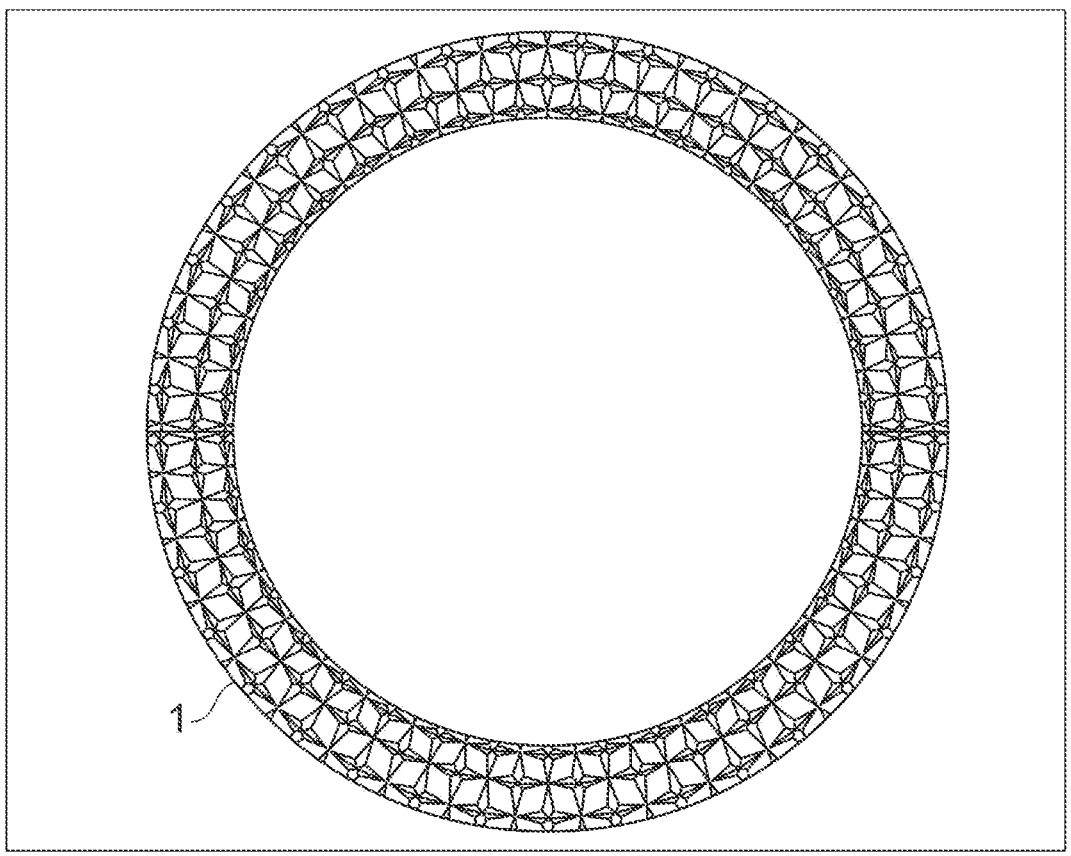
FIG. 2 is a diagram illustrating the vehicle steering wheel cover according to the embodiment of the present invention viewed from the front side.
Figure 3:
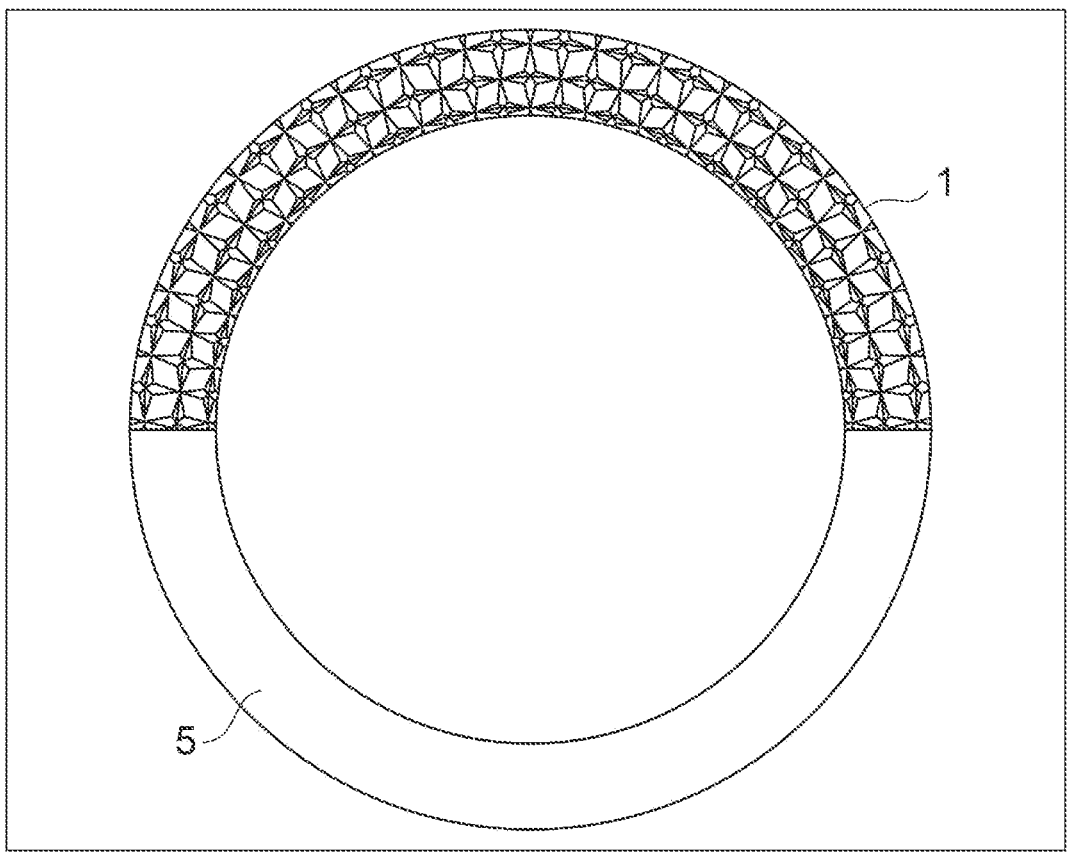
FIG. 3 is a diagram illustrating the vehicle steering wheel cover according to the embodiment of the present invention viewed from the back side.
Figure 4:
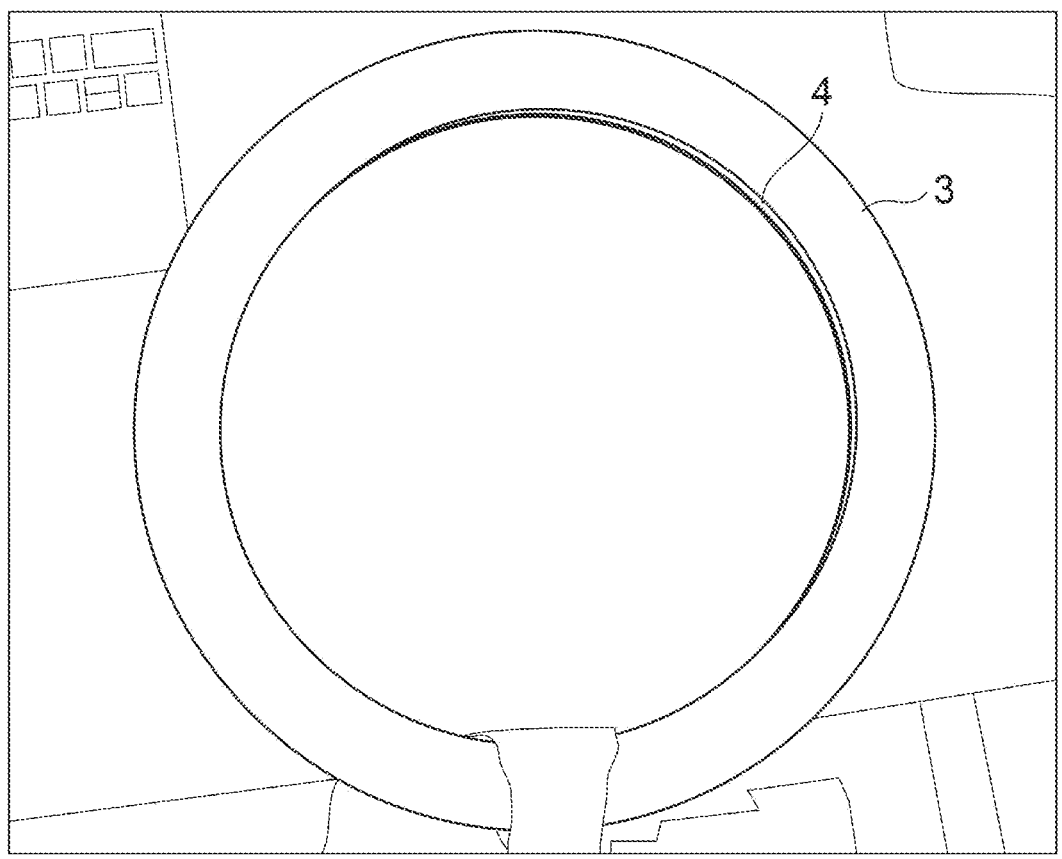
FIG. 4 is a diagram illustrating a ring-shape tube of the vehicle steering wheel cover according to the embodiment of the present invention viewed from the front side.
Figure 7:
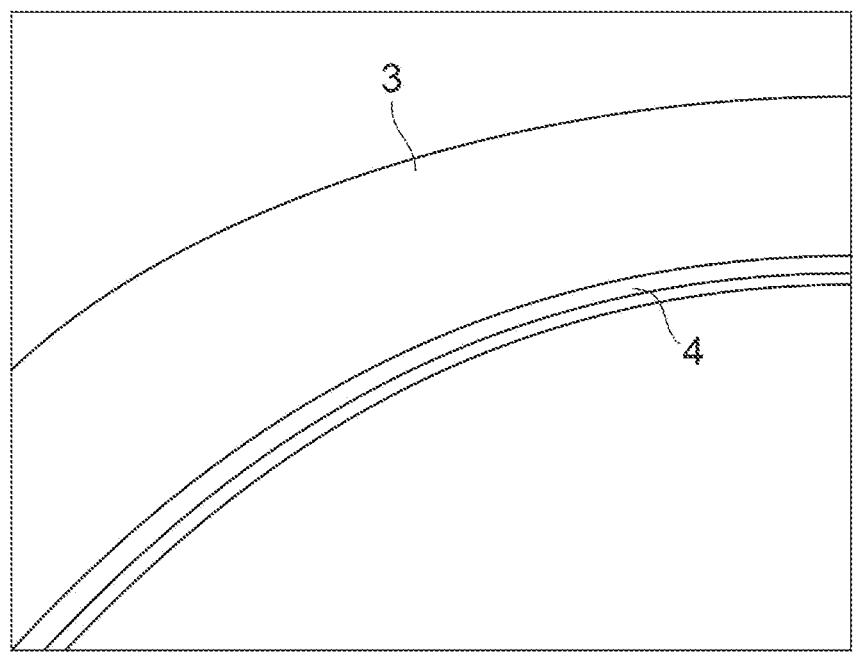
FIG. 7 is a diagram illustrating a part of the ring-shape tube and a slit.

FIGS. 1 to 4 and FIG. 7 are referred to first. FIG. 1 is a diagram illustrating a vehicle steering wheel cover 1 according to an embodiment of the present invention attached to a steering wheel 2. FIG. 2 is a diagram illustrating the vehicle steering wheel cover 1 according to the embodiment of the present invention viewed from the front side and FIG. 3 is a diagram illustrating the vehicle steering wheel cover 1 according to the embodiment of the present invention viewed from the back side. FIG. 4 is a ring-shape tube 3 of the vehicle steering wheel cover 1 according to the embodiment of the present invention. FIG. 7 is a diagram illustrating a part of the ring-shape tube 3 and a slit 4 according to the embodiment of the present invention.

The ring-shape tube 3 is made of resin such as rubber (natural rubber, styrene butadiene rubber, chloroprene rubber, acrylonitrile rubber, butyl rubber, ethylene propylene rubber, urethane rubber, silicone rubber, fluorine rubber, chlorosulfonated polyethylene rubber or the like) and is also called a "core material." As described above, the vehicle steering wheel cover 1 is the ring-shape tube 3 and is provided with the slit 4 formed so as to fit the steering wheel 2 along the inner circumference inside the ring-shape tube 3 (see FIG. 4 and FIG. 7). The hardness of material of a part of the ring-shape tube 3 is lower than the hardness of material of the other parts of the tube. According to the embodiment, the part with low hardness, which is a part of the ring-shape tube 3 (low hardness (part) 5) is the back side part of the steering wheel (see FIG. 3) when the vehicle steering wheel cover 1 is attached to the steering wheel 2. According to the embodiment, the part with low hardness, which is a part of the ring-shape tube 3 (low hardness (part)) 5) is the back side part of the steering wheel and a lower-half of the steering wheel (see FIG. 3).

Next, FIG. 12 is referred to. FIG. 12 is a diagram illustrating test results when the thickness and hardness of the ring-shape tube 3 are changed. It describes an attaching time to the steering wheel depending on the thickness, hardness (other parts), low hardness (part) 5 of the ring-shape tube 3 and comments regarding the attachment, and this makes it possible to know which combination of thickness and hardness is appropriate. According to this, when the thickness is 3.5 mm (tolerance±0.5 mm) and the hardness (other parts) is 70 degrees (tolerance±5 degrees), low hardness (part) is 55 degrees (tolerance±5 degrees) to 60 degrees (tolerance±5 degrees), it is seen that when the attaching time is 15 seconds, the attachment to the steering wheel 2 is also firm and it is hard to slip. The experiment results show that according to the embodiment, the hardness of material of a part of the ring-shape tube 3 is approximately 55 degrees (tolerance±5 degrees) to approximately 60 degrees (tolerance±5 degrees). Furthermore, according to the embodiment, the hardness of material of the other parts of the ring-shape tube 3 is approximately 70 degrees (tolerance±5 degrees) to approximately 75 degrees (tolerance±5 degrees). As described above, the hardness of material of the other parts of the ring-shape tube is optimally approximately 70 degrees in the embodiment. Note that the hardness is defined according to a method defined in JIS K6253-3:2012 (vulcanized rubber and thermoplastic rubber—How to obtain hardness—Part III: durometer hardness). According to the embodiment, the thickness of the ring-shape tube 3 is approximately 2.5 mm (tolerance±0.5 mm) to approximately 3.5 mm (tolerance±0.5 mm). As described above, the thickness of the ring-shape tube 3 is optimally approximately 3.5 mm (tolerance±0.5 mm) in the embodiment.

Figure 5:
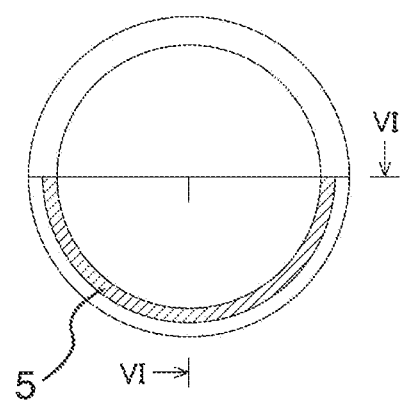
FIG. 5 is a plan view of the vehicle steering wheel cover according to the embodiment of the present invention where part of the back side with low hardness is shaded in diagonal.
Figure 6:
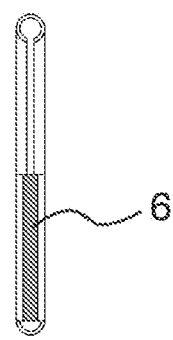
FIG. 6 is a VI-VI cross-sectional view of FIG. 5 with the lower part indicating the embodiment where there is a mesh inside the ring-shape tube.

FIG. 5 and FIG. 6 are referred to. FIG. 5 is a plan view of the ring-shape tube 3 and FIG. 6 is a VI-VI cross-sectional view of FIG. 5. The area shaded in diagonal of FIG. 5 is the low hardness (part) 5 of the ring-shape tube 3. According to the embodiment, the inside of the ring-shape tube 3 may also be a reticulated shape 6.

Figure 8:
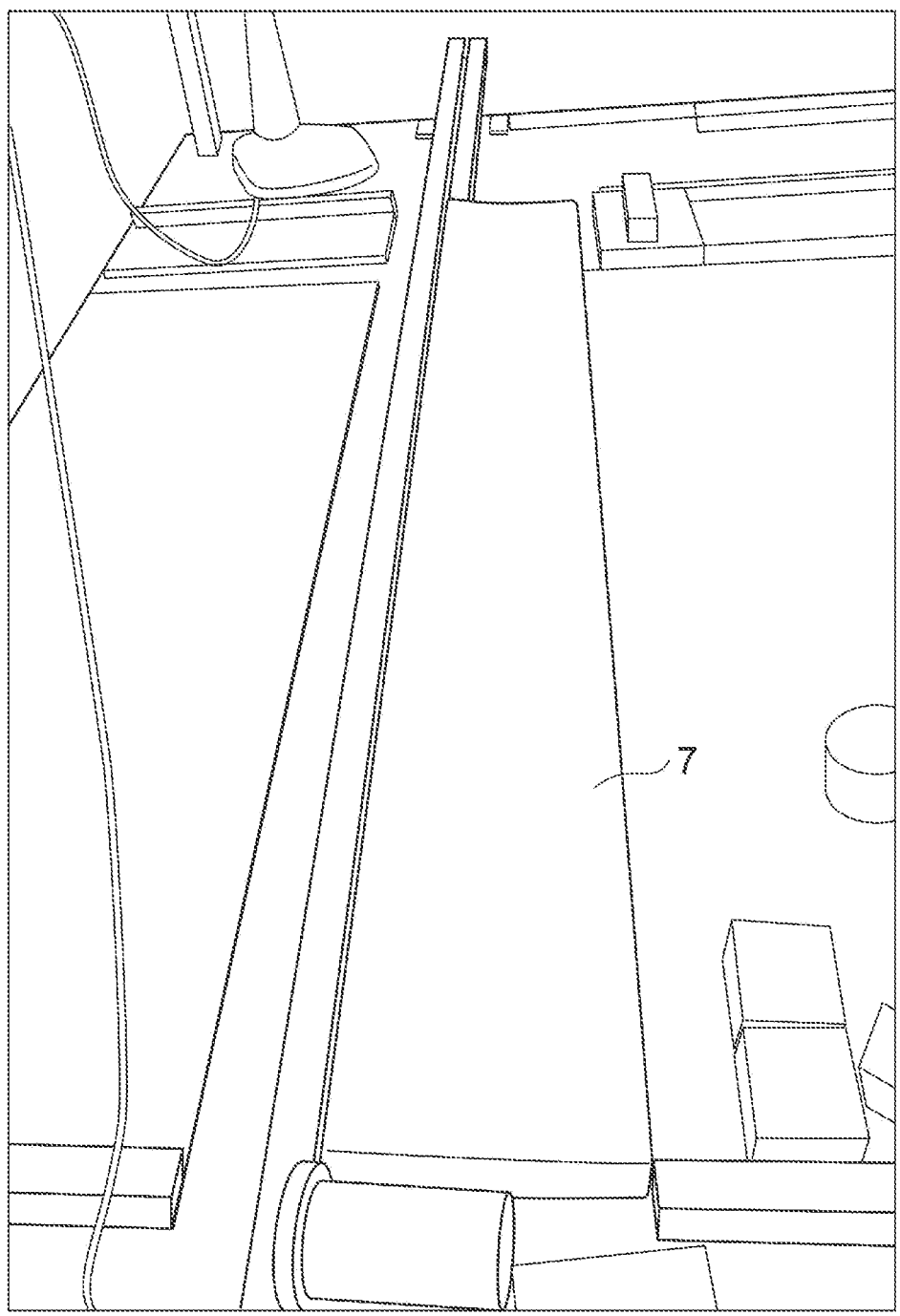
FIG. 8 is a diagram illustrating fabric before cutting.
Figure 9:
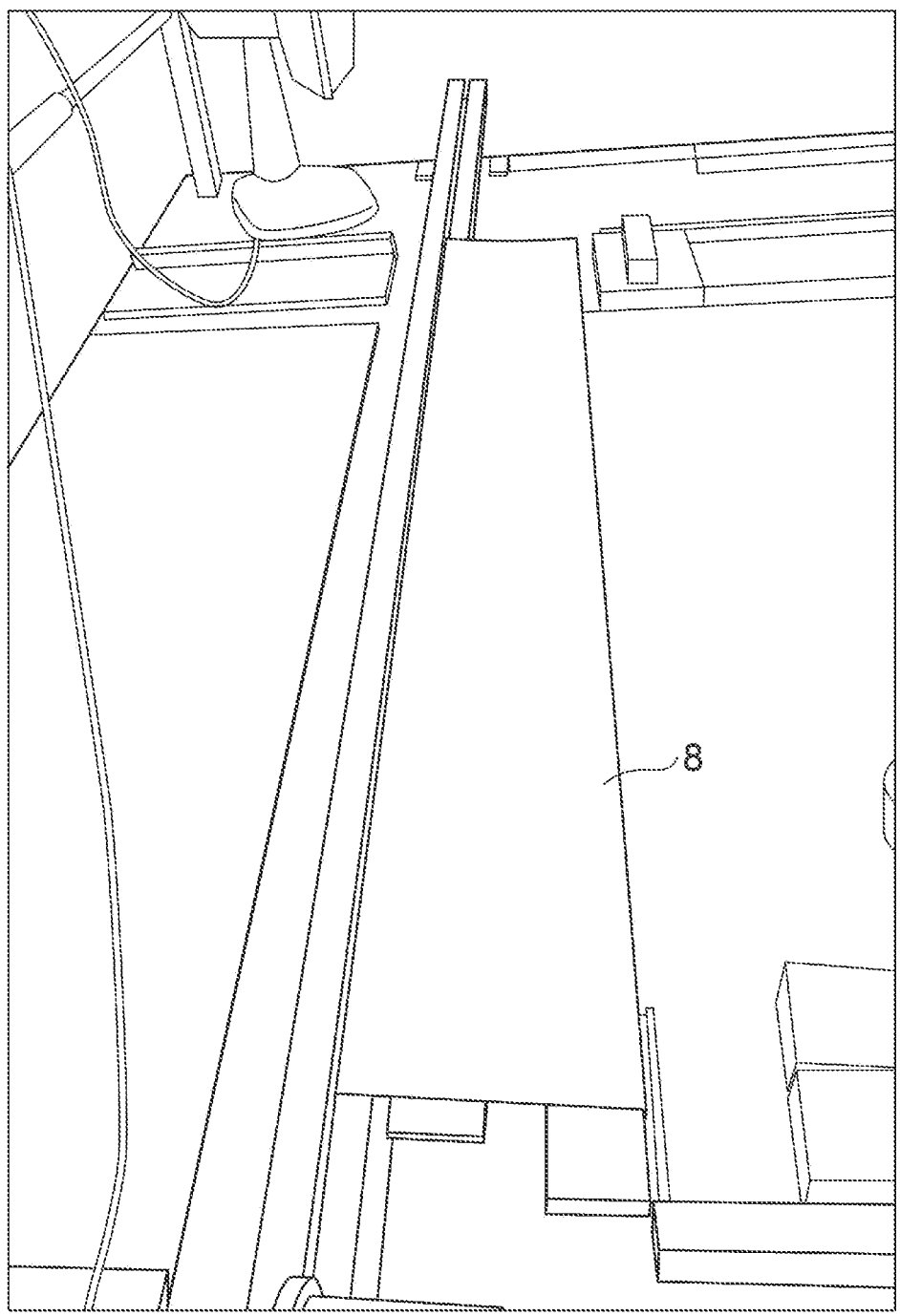
FIG. 9 is a diagram illustrating sponge before cutting.
Figure 10:
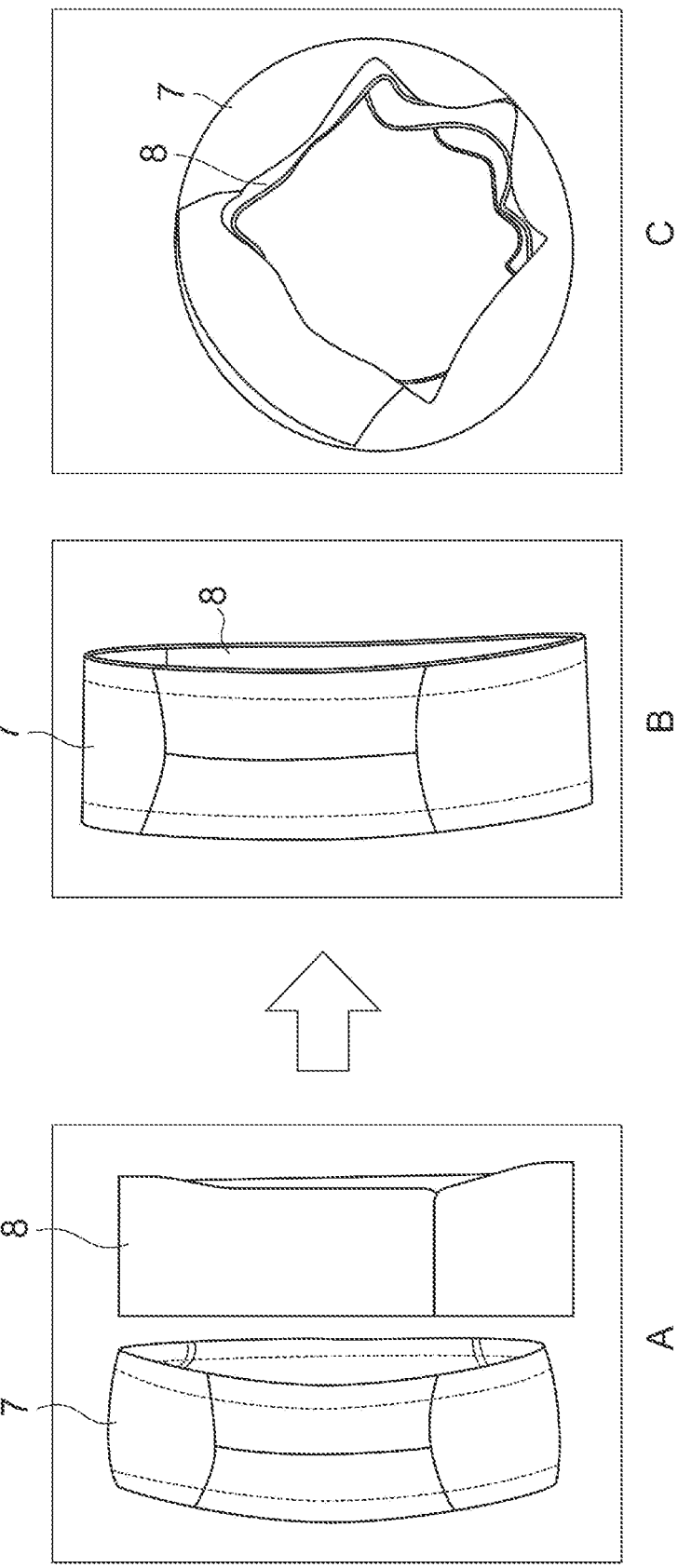
FIG. 10 is a diagram illustrating a step of sewing circular fabric and circular sponge overlapping.
Figure 11:
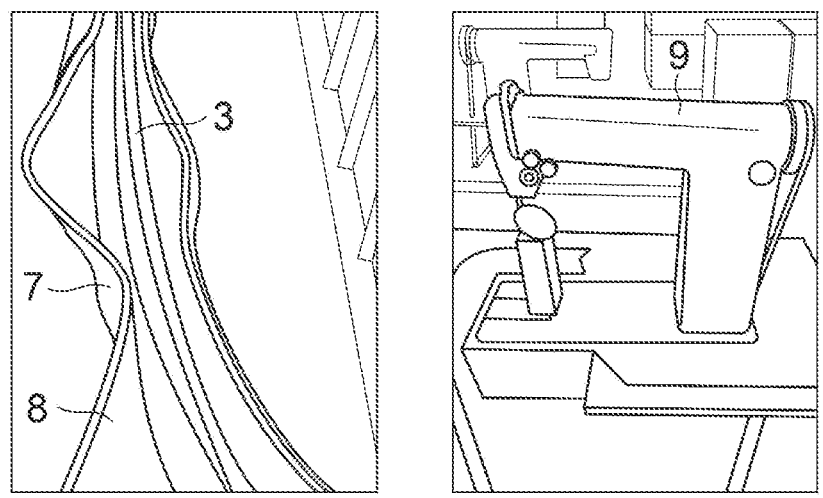
FIG. 11 is a diagram illustrating a step of sewing the fabric sewn into the ring-shape tube and the sponge together.
Figure 11:
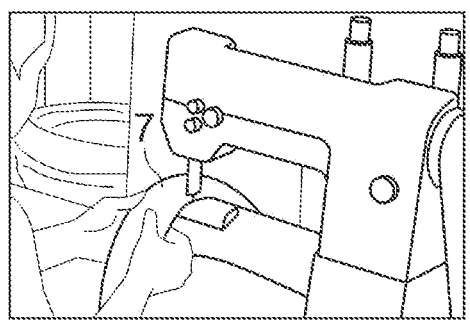
Figure 11:
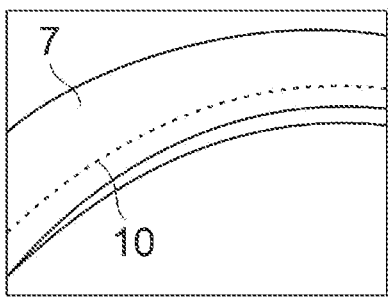
Figure 11:
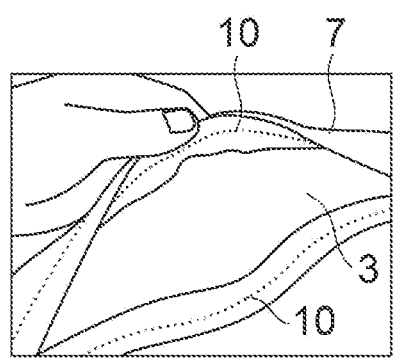
Figure 11:
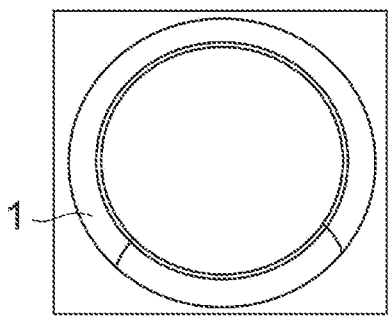

FIG. 8 and FIGS. 9 to 11 are referred to. FIG. 8 is a diagram illustrating fabric 7 before cutting, FIG. 9 is a diagram illustrating sponge 8 before cutting and FIG. 10 is a diagram illustrating a step of sewing the circular fabric 7 and the circular sponge 8 and FIG. 11 is a diagram illustrating a step of sewing the circular fabric sewn into the ring-shape tube and the circular sponge together. The material of the fabric 7 varies from product to product, and examples include PVC, synthetic leather, leather, vinyl, polyester, cotton and the like. PU is mainly used as the material of sponge, but any material may be used as long as it guarantees functionality as the sponge. The ring-shape tube 3 is covered with the circular fabric 7 and the circular fabric is sewn into the ring-shape tube 3. In FIG. 10 and FIG. 11, although the circular fabric 7 is sewn with the circular sponge 8 overlapping, only the circular fabric is sewn into the ring-shape tube 3 in the embodiment.

In the embodiment, the circular sponge 8 is sewn inside the circular fabric 7. In the case of the present embodiment, the circular fabric 7 is sewn with the circular sponge 8 overlapping as shown in FIG. 10 and FIG. 11.

Next, a method for manufacturing the steering wheel cover according to the embodiment of the present invention will be described. With reference to FIG. 1, FIG. 7, FIG. 8, FIG. 9, FIG. 10 and FIG. 11 again, rubber materials with different hardness are prepared first and the ring-shape tube is produced by press molding. That is, the method includes a step of producing the ring-shape tube 3 using a material with varying hardness. In that case, the slit 4 is provided for one round along the inner circumference of the ring-shape tube 3. That is, the step of providing the slit along the inner circumference of the ring-shape tube 3 is included. The embodiment further includes a step of cutting the fabric 7 in FIG. 8, a step of circularly sewing the cut fabric 7 as shown by A in FIG. 10 and a step of covering the ring-shape tube 3 with the circular fabric 7 as shown in FIG. 11 and sewing the cut fabric 7 into the ring-shape tube 3 using a sewing machine 9. There is a seam 10 in the fabric 7 shown by D in FIG. 11, and as shown by E in FIG. 11, the fabric 7 may be folded inside the ring-shape tube 3 and sewn according to the seam 10. The embodiment further includes a step of cutting the sponge 8 in FIG. 9, a step of circularly sewing the cut sponge 8 as shown by A in FIG. 10 and a step of sewing the circular sponge 8 inside the circular fabric 7 as shown by A to C in FIG. 10 before covering the ring-shape tube 3 with the circular fabric 7.

Although the embodiment of the present invention has been described in detail with reference to the accompanying drawings, the specific configuration is not limited to the present embodiment, and design changes to an extent not departing from the spirit and scope of the present invention are included in the present invention.

The invention claimed is:

1. A vehicle steering wheel cover configured to cover a steering wheel, the vehicle steering wheel cover comprising:
   a front half facing a driver and a rear half on a side opposite from the front half, the rear half facing away from the driver;
   a ring-shape tube sewn inside a circular fabric and a circular sponge disposed between the circular fabric and the ring-shape tube,
   wherein the ring-shape tube comprises a slit formed so as to fit the steering wheel along an inner circumference inside the ring-shape tube, wherein the ring-shape tube includes a first part defining the inner circumference and a second part, the second part having a hardness of material lower than a hardness of material for the first part, wherein when the vehicle steering wheel cover is fitted to the steering wheel, the second part of the ring-shape tube is located only on the rear half and a lower half of the steering wheel.

2. The vehicle steering wheel cover according to claim 1, wherein the hardness of material of the second part of the ring-shape tube is approximately 50 degrees to approximately 65 degrees.

3. The vehicle steering wheel cover according to claim 2, wherein the hardness of material of the first part of the ring-shape tube is approximately 65 degrees to approximately 80 degrees.

4. The vehicle steering wheel cover according to claim 3, wherein the hardness of material of the first part of the ring-shape tube is approximately 70 degrees.

5. The vehicle steering wheel cover according to claim 1, wherein the thickness of the ring-shape tube is approximately 2 mm to approximately 4 mm.

6. The vehicle steering wheel cover according to claim 5, wherein the thickness of the ring-shape tube is approximately 3 mm to approximately 4 mm.

7. The vehicle steering wheel cover according to claim 1, wherein the inside of the ring-shape tube is reticulated.

8. The vehicle steering wheel cover according to claim 1, wherein the circular sponge is sewn inside the circular fabric.

9. A method for producing the vehicle steering wheel cover according to claim 1, the method comprising:
- a step of producing the ring-shape tube using the material with varying hardness; and
- a step of providing the slit along the inner circumference of the ring-shape tube.

10. The method for producing the vehicle steering wheel cover according to claim 9, further comprising:
- a step of cutting fabric;
- a step of sewing the cut fabric into a circular shape; and
- a step of covering the ring-shape tube with the circular fabric and sewing the fabric into the ring-shape tube.

11. The method for producing the vehicle steering wheel cover according to claim 9, further comprising:
- a step of cutting a sponge;
- a step of sewing the cut sponge into a circular shape; and
- a step of sewing the circular sponge inside the circular fabric before covering the tube-shape tube with the circular fabric.

* * * * *